United States Patent
Paik et al.

(10) Patent No.: US 10,339,258 B2
(45) Date of Patent: Jul. 2, 2019

(54) LOOK-AHEAD TIMING PREDICTION FOR MULTI-INSTANCE MODULE (MIM) ENGINEERING CHANGE ORDER (ECO)

(71) Applicant: Synopsys, Inc., Mountain View, CA (US)

(72) Inventors: Seungwhun Paik, Sunnyvale, CA (US); Nahmsuk Oh, Palo Alto, CA (US); Subramanyam Sripada, Hillsboro, OR (US); Rupesh Nayak, San Ramon, CA (US)

(73) Assignee: SYNOPSYS, INC., Mountain View, CA (US)

( * ) Notice: Subject to any disclaimer, the term of this patent is extended or adjusted under 35 U.S.C. 154(b) by 132 days.

(21) Appl. No.: 14/788,051

(22) Filed: Jun. 30, 2015

(65) Prior Publication Data

US 2017/0004244 A1     Jan. 5, 2017

(51) Int. Cl.
    *G06F 17/50* (2006.01)

(52) U.S. Cl.
    CPC ...... *G06F 17/5081* (2013.01); *G06F 17/5031* (2013.01); *G06F 17/5068* (2013.01); *G06F 2217/68* (2013.01); *G06F 2217/84* (2013.01)

(58) Field of Classification Search
    None
    See application file for complete search history.

(56) References Cited

U.S. PATENT DOCUMENTS

| | | | | |
|---|---|---|---|---|
| 6,574,788 B1 * | 6/2003 | Levine | ........... | G06F 17/5068 716/102 |
| 7,089,521 B2 * | 8/2006 | Kurzum | ........... | G06F 17/5072 716/122 |
| 7,124,380 B2 * | 10/2006 | Keller | ........... | G06F 17/5022 716/112 |
| 7,451,412 B2 * | 11/2008 | Jones | ........... | G06F 17/5031 703/14 |
| 7,454,731 B2 * | 11/2008 | Oh | ........... | G06F 17/5022 716/113 |
| 7,581,201 B2 * | 8/2009 | Kazda | ........... | G06F 17/5068 716/113 |
| 7,962,876 B2 * | 6/2011 | Oh | ........... | G06F 17/5022 716/113 |
| 7,971,168 B1 * | 6/2011 | Swanson | ........... | G06F 17/5045 716/108 |
| 7,984,415 B1 * | 7/2011 | Srinivasan | ........... | G06F 17/505 326/41 |

(Continued)

OTHER PUBLICATIONS

A. Sripada et al., "A Timing Graph Based Approach to Mode Merging," ACM DAC'15, Jun. 7-11, 2015, pp. 1-6.*

(Continued)

*Primary Examiner* — Leigh M Garbowski
(74) *Attorney, Agent, or Firm* — Park, Vaughan, Fleming & Dowler LLP; Laxman Sahasrabuddhe

(57) ABSTRACT

Some embodiments determine a merged timing graph for a multi-instance module (MIM), wherein each node in the merged timing graph corresponds to a pin in the MIM, and wherein each node in the merged timing graph stores timing information associated with the corresponding pins in multiple instances of the MIM in a circuit design. The embodiments can then determine an ECO for the MIM based on the merged timing graph.

12 Claims, 5 Drawing Sheets

---

Apply the ECO to each of the multiple instances of the MIM in the circuit design, wherein said applying results in a change in timing information
142

↓

Propagate the change in the timing information through the merged timing graph
144

↓

Update timing information of pins in each of the MIM instances corresponding to each node in the merged timing graph whose timing information is updated during said propagating
146

(56) References Cited

U.S. PATENT DOCUMENTS

| | | | | |
|---|---|---|---|---|
| 8,219,944 B2* | 7/2012 | Song | G06F 17/5036 | 716/103 |
| 8,261,221 B2* | 9/2012 | Singhal | G06F 17/5031 | 716/107 |
| 8,302,038 B2* | 10/2012 | Chen | G06F 17/5054 | 716/100 |
| 8,407,655 B2* | 3/2013 | Oh | G06F 17/505 | 716/106 |
| 8,448,113 B2* | 5/2013 | Amundson | G06F 17/5031 | 716/113 |
| 8,607,186 B2* | 12/2013 | Sripada | G06F 17/5022 | 703/13 |
| 8,615,727 B2* | 12/2013 | Ghanta | G06F 17/5031 | 716/134 |
| 8,627,262 B2* | 1/2014 | Sripada | G06F 17/5031 | 716/106 |
| 8,745,561 B1* | 6/2014 | Garg | G06F 17/5031 | 703/16 |
| 8,776,000 B2* | 7/2014 | Chang | G06F 17/5031 | 716/100 |
| 8,788,995 B1* | 7/2014 | Kumar | G06F 17/5031 | 716/110 |
| 8,875,082 B1* | 10/2014 | Sircar | G06F 17/5068 | 716/110 |
| 8,893,070 B2* | 11/2014 | Avidan | G06F 17/5077 | 716/119 |
| 9,177,090 B1* | 11/2015 | Tzeng | G06F 17/5031 | |
| 9,418,192 B1* | 8/2016 | Bai | G06F 17/5081 | |
| 2009/0172620 A1* | 7/2009 | Yoshida | G06F 17/5031 | 716/113 |
| 2012/0144353 A1* | 6/2012 | Kamdar | G06F 17/5031 | 716/108 |
| 2015/0269304 A1* | 9/2015 | Zahn | G06F 17/5081 | 716/113 |
| 2016/0070844 A1* | 3/2016 | Shyamsukha | G06F 17/5081 | 716/113 |

OTHER PUBLICATIONS

L. S. Ang et al., "Cone Extraction Technique for Incremental Static Timing Analysis," 2011 IEEE Symposium on Industrial Electronics and Applications (ISIEA2011), Sep. 25-28, 2011, pp. 267-272.*

S. Ghiasi, "On Incremental Component Implementation Selection in System Synthesis," IEEE Trans. on VLSI Systems, vol. 18, No. 11, Nov. 2010, pp. 1578-1589.*

A.J. Daga et al., "Automated Timing Model Generation," 2002 ACM Design Automation Conference, pp. 146-151. (Year: 2002).*

N. Oh et al., "Fast Crosstalk Repair by Quick Timing Change Estimation," Proc. of the 8th Int'l Symposium on Quality Electronic Design (ISQED'07), 2007 IEEE, 6 pages. (Year: 2007).*

* cited by examiner

```
┌─────────────────────────────────────────────────────┐
│ Determine a merged timing graph for the MIM, wherein each │
│ node in the merged timing graph corresponds to a pin in the │
│ MIM, and wherein each node in the merged timing graph is │
│ associated with a data structure that stores timing information │
│ associated with the corresponding pins across the multiple │
│ instances of the MIM │
│ 102 │
└─────────────────────────────────────────────────────┘
                          │
                          ▼
┌─────────────────────────────────────────────────────┐
│ Determine an ECO for the MIM based on the merged timing │
│ graph │
│ 104 │
└─────────────────────────────────────────────────────┘
```

FIG. 1A

```
┌─────────────────────────────────────────────────────┐
│ Compute timing information at one or more pins in each of the │
│ multiple instances of the MIM │
│ 122 │
└─────────────────────────────────────────────────────┘
                          │
                          ▼
┌─────────────────────────────────────────────────────┐
│ Create a timing graph, wherein each node in the timing graph │
│ corresponds to a pin in the MIM, and each edge in the timing │
│ graph corresponds to a timing arc in the MIM │
│ 124 │
└─────────────────────────────────────────────────────┘
                          │
                          ▼
┌─────────────────────────────────────────────────────┐
│ For each node in the timing graph, store timing information │
│ associated with pins in the multiple instances of the MIM that │
│ correspond to the node of the merged timing graph, wherein the │
│ timing information is stored in a data structure associated with │
│ the node │
│ 126 │
└─────────────────────────────────────────────────────┘
```

FIG. 1B

Data structure associated with node 408 in merged timing graph 406

US 10,339,258 B2

LOOK-AHEAD TIMING PREDICTION FOR MULTI-INSTANCE MODULE (MIM) ENGINEERING CHANGE ORDER (ECO)

BACKGROUND

Technical Field

This disclosure relates to electronic design automation (EDA). More specifically, this disclosure relates to look-ahead timing prediction for multi-instance module (MIM) engineering change order (ECO).

Related Art

Advances in process technology and a practically unlimited appetite for consumer electronics have fueled a rapid increase in the size and complexity of integrated circuit (IC) designs. The term "module" can generally refer to an arbitrary portion of a circuit design. Today's complex circuit designs can include multiple instances of the same module, and such a module is called a multi-instance module or MIM for short (the term "multi-instance block," or MIB for short, can also be used to refer to an MIM). For example, an example of an MIM is a processor core; an IC may have multiple instances of the processor core MIM.

A set of design requirements can be defined to ensure that a manufactured chip will perform as desired. Typically, a circuit design is not manufactured until it satisfies the design requirements which can include, but are not limited to, timing requirements, noise requirements, power requirements, etc.

Before a circuit design is signed-off, a compliance checking tool is typically used to identify any leftover design requirement violations in a circuit design. Incremental adjustments—also known as ECOs—are then made to the circuit design to fix the design requirement violations. Once the circuit design is violation free, the circuit design can be readied for manufacturing.

Determining a good set of ECOs to fix the design requirement violations can be difficult because applying an ECO to a circuit design may create new design requirement violations and/or may introduce undesirable inconsistencies in the circuit design.

SUMMARY

Some embodiments described herein provide methods and systems for determining one or more ECOs for a MIM in a circuit design that includes multiple instances of the MIM. ECOs that can be determined by these embodiments can include, but are not limited to, ECOs that fix design requirement violations, ECOs that reduce area of the circuit design, and ECOs that reduce power of the circuit design.

During operation, some embodiments can determine a merged timing graph for an MIM, wherein each node in the merged timing graph corresponds to a pin in the MIM, and wherein each node in the merged timing graph stores timing information associated with the corresponding pins in multiple instances of the MIM in the circuit design. The embodiments can then determine an ECO for the MIM based on the merged timing graph.

In some embodiments, determining the merged timing graph for the MIM comprises: computing timing information at one or more pins in each of the multiple instances of the MIM; creating a timing graph, wherein each node in the timing graph corresponds to a pin in the MIM, and each edge in the timing graph corresponds to a timing arc in the MIM; and for each node in the timing graph, storing timing information associated with pins in the multiple instances of the MIM that correspond to the node of the merged timing graph, wherein the timing information is stored in a data structure associated with the node.

In some embodiments, determining the ECO for the MIM comprises: determining the worst timing information for each node in the merged timing graph based on the stored timing information associated with the multiple instances of the MIM; and determining the ECO for the MIM based on the worst timing information at each node in the merged timing graph.

Some embodiments can apply the ECO to each of the multiple instances of the MIM in the circuit design, wherein said applying may result in a change in timing information. Next, the embodiments can propagate the change in the timing information through the merged timing graph. The embodiments can then update timing information of pins in each of the MIM instances corresponding to each node in the merged timing graph whose timing information was updated during said propagating.

BRIEF DESCRIPTION OF THE FIGURES

FIG. 1A illustrates a process for determining an ECO for a circuit design that includes multiple instances of an MIM in accordance with some embodiments described herein.

FIG. 1B illustrates a process for determining a merged timing graph in accordance with some embodiments described herein.

DETAILED DESCRIPTION

Figure 1C:
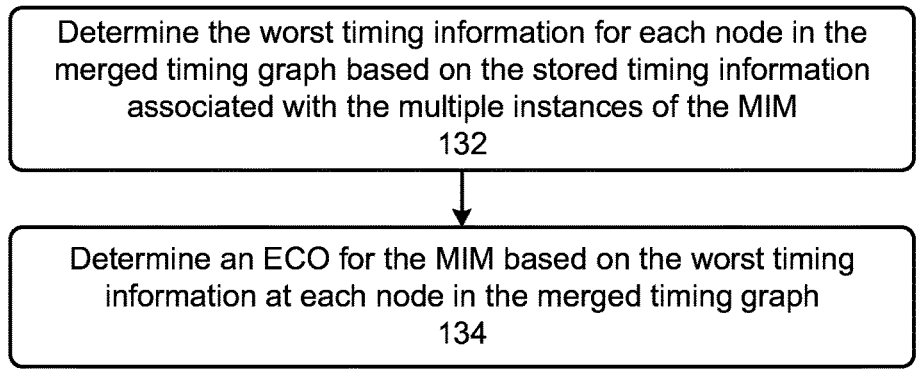
FIG. 1C illustrates a process for determining an ECO for the MIM based on the merged timing graph in accordance with some embodiments described herein.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview of an EDA Flow

An EDA flow can be used to create a circuit design. Once the circuit design is finalized, it can undergo fabrication, packaging, and assembly to produce integrated circuit chips. An EDA flow can include multiple steps, and each step can involve using one or more EDA software tools. Some EDA steps and software tools are described below. These examples of EDA steps and software tools are for illustrative purposes only and are not intended to limit the embodiments to the forms disclosed.

Some EDA software tools enable circuit designers to describe the functionality that the circuit designers want to implement. These tools also enable circuit designers to perform what-if planning to refine functionality, check costs, etc. During logic design and functional verification, the HDL (hardware description language), e.g., SystemVerilog, code can be written and the design can be checked for functional accuracy, e.g., the design can be checked to ensure that it produces the correct outputs.

During synthesis and design for test, the HDL code can be translated to a netlist using one or more EDA software tools. Further, the netlist can be optimized for the target technology, and tests can be designed and implemented to check the finished chips. During netlist verification, the netlist can be checked for compliance with timing constraints and for correspondence with the HDL code.

During design planning, an overall floorplan for the chip can be constructed and analyzed for timing and top-level routing. During physical implementation, circuit elements can be positioned in the layout and can be electrically coupled.

During analysis and extraction, the circuit's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped-out" to produce masks which are used during fabrication.

Look-Ahead Timing Prediction for MIM ECO

FIG. 1A illustrates a process for determining an ECO for a circuit design that includes multiple instances of an MIM in accordance with some embodiments described herein. The process can begin by determining a merged timing graph for the MIM, wherein each node in the merged timing graph corresponds to a pin in the MIM, and wherein each node in the merged timing graph is associated with a data structure that stores timing information associated with the corresponding pins across the multiple instances of the MIM (operation 102). Next, the process can determine an ECO for the MIM based on the merged timing graph (operation 104).

Figure 2:
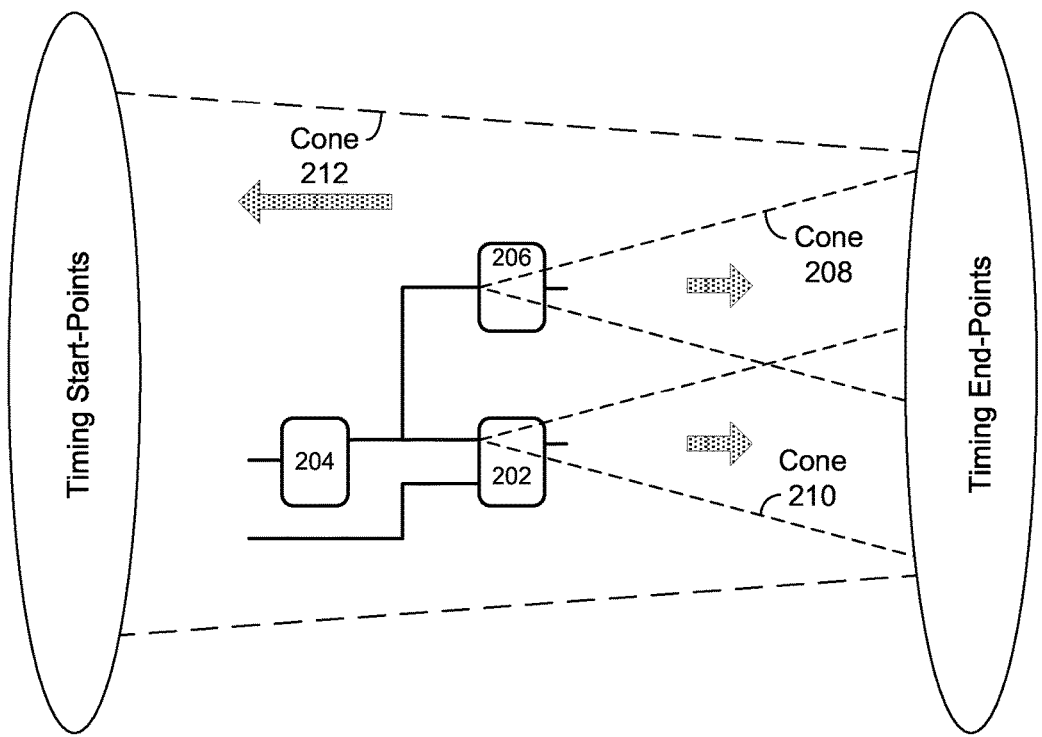
FIG. 2 illustrates how timing information can be computed at pins in a circuit design in accordance with some embodiments described herein.
Figure 3:
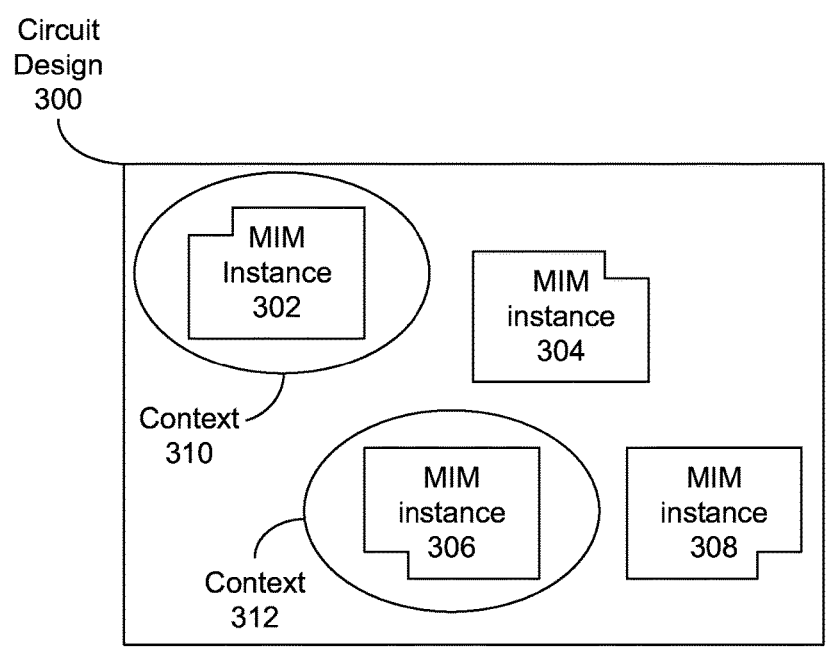
FIG. 3 illustrates an example of a circuit design that includes multiple MIM instances in accordance with some embodiments described herein.
Figure 4A:
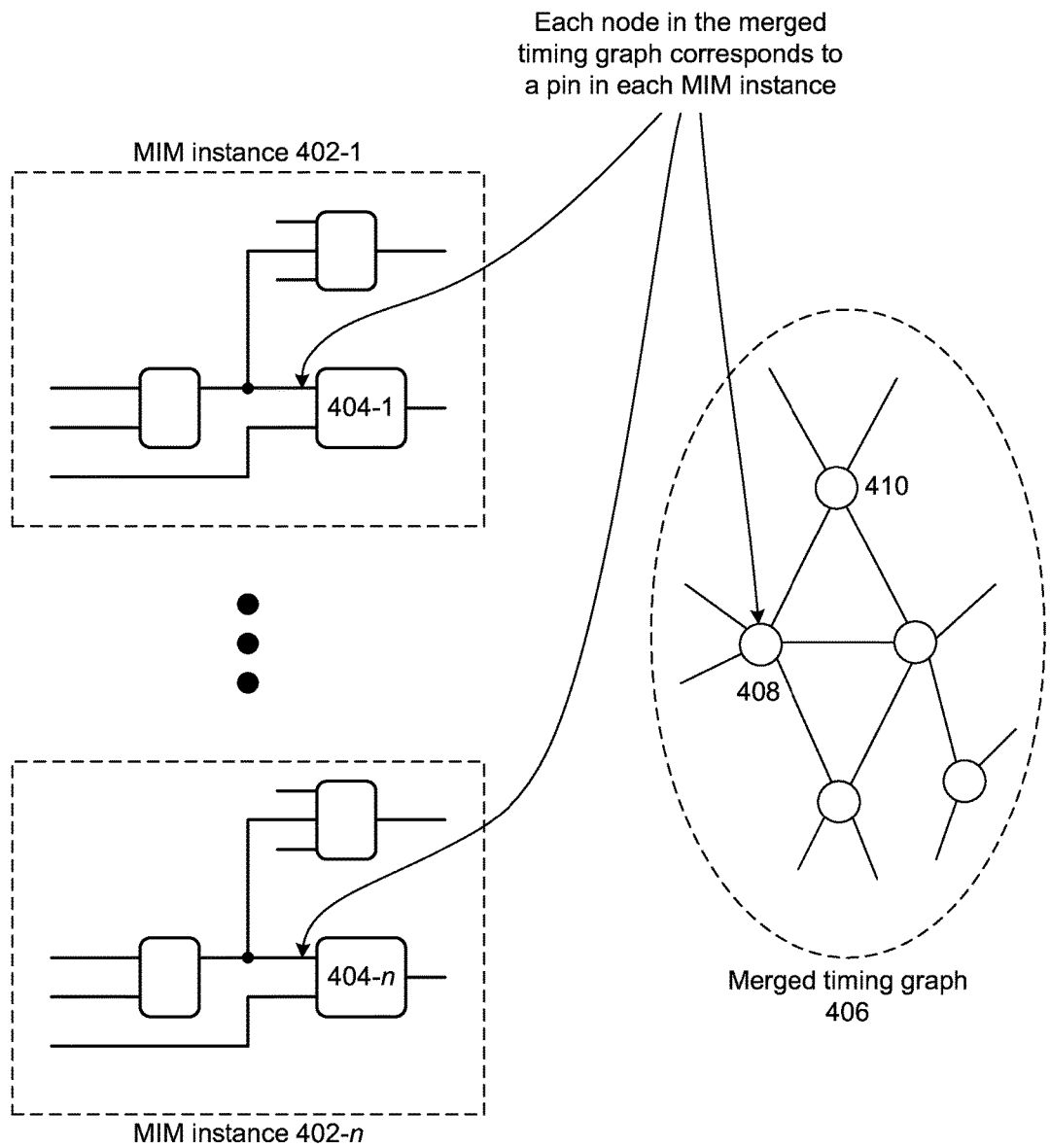
FIG. 4A illustrates a merged timing graph in accordance with some embodiments described herein.
Figure 4B:
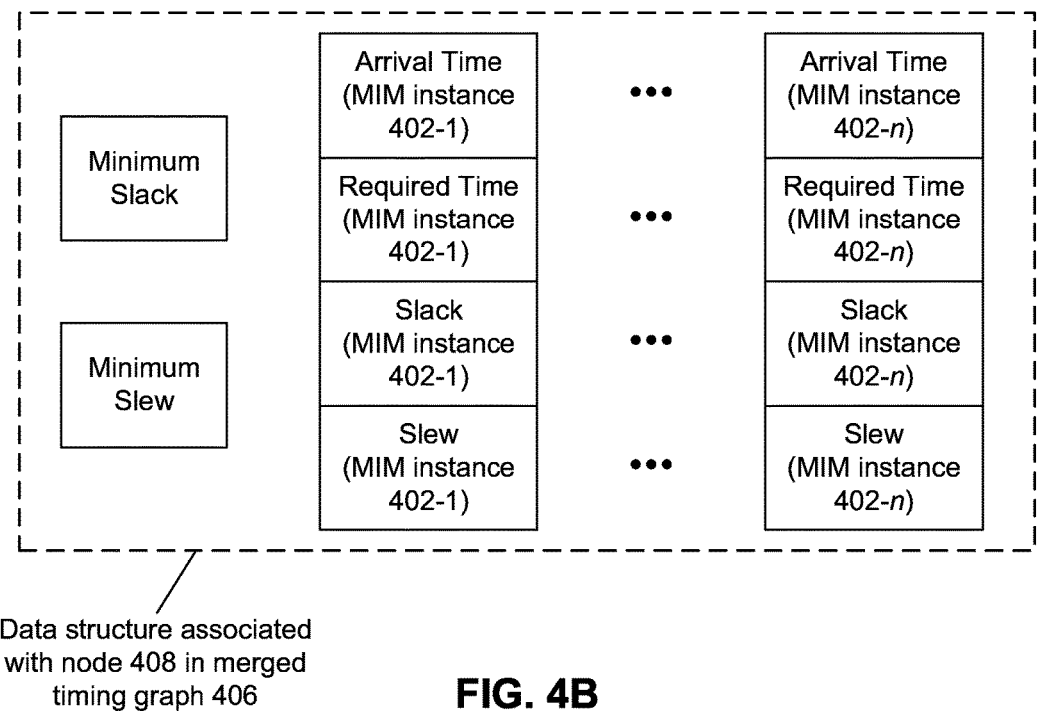
FIG. 4B illustrates an example of a data structure associated with a node in a merged timing graph in accordance with some embodiments described herein.

FIG. 1B provides further details of operation 102 by illustrating a process for determining a merged timing graph in accordance with some embodiments described herein. The process can begin by computing timing information at one or more pins in each of the multiple instances of the MIM (operation 122). The process can then create a timing graph, wherein each node in the timing graph corresponds to a pin in the MIM, and each edge in the timing graph corresponds to a timing arc in the MIM (operation 124). Next, for each node in the timing graph, the process can store timing information associated with pins in the multiple instances of the MIM that correspond to the node of the merged timing graph, wherein the timing information is stored in a data structure associated with the node (operation 126). FIG. 2 and FIG. 3 described below provide further details of how timing information can be computed and why corresponding pins in different MIM instances may have different timing information. FIGS. 4A and 4B, which are also described below, provide further details of a merged timing graph and of a data structure that can be associated with a node in the merged timing graph.

FIG. 2 illustrates how timing information can be computed at pins in a circuit design in accordance with some embodiments described herein. The data signal flows from the left to the right in FIG. 2, i.e., output of gate 204 is electrically connected to the inputs of gates 202 and 206, etc. Each timing start-point can generally be any pin in the circuit design where an arrival time for a signal has been specified. Each timing end-point can generally be any pin in the circuit design where a required time for a signal has been specified. For example, a timing start-point can be a register output or a primary input, and a timing end-point can be a register input or a primary output. The arrival time at a register output can be the time between a clock edge and the time when the register output is ready to drive an input of a gate that is electrically connected to the register output. The required time at a register input can be the time when the register input needs to be provided a particular signal value so that the register can successfully and consistently latch the provided value at the next clock edge.

Given the arrival times at the timing start-points, the arrival times at other pins in the circuit design can be computed by adding the delays of the circuit elements and nets as one moves through the circuit design forward from the timing start-points to the timing end-points. For example, let the arrival time at the input of gate 204 be $a_{204}$, and the delay of the timing arc from the input of gate 204 to the output of gate 204 be $d_{204}$. Then the arrival time at the inputs of gates 202 and 206 would be $(a_{204}+d_{204})$. If an output pin of a gate has multiple arrival times that correspond to different input-to-output timing arcs, then the output pin can be associated with the maximum arrival time value (i.e., the worst arrival time for a setup timing requirement), and this maximum arrival time value can be propagated to the input pins of the gates that are electrically connected to the output pin. In this manner, the arrival time computation can be performed starting from the timing start-points and ending at the timing end-points.

Likewise, given the required times at the timing end-points, the required times at other pins in the circuit design can be computed by subtracting the delays of the circuit elements and nets as one moves through the circuit design backward from the timing end-points to the timing start-points. For example, let the required times at the outputs of gates 202 and 206 be $r_{202}$ and $r_{206}$, respectively, and the delays of the timing arcs from the inputs to the outputs of gates 202 and 206 be $d_{202}$ and $d_{206}$, respectively. Then the required times at the inputs of gates 202 and 206 would be $(r_{202}-d_{202})$ and $(r_{206}-d_{206})$, respectively. The required time for the output of gate 204 can be computed by taking the minimum of these two required times (i.e., the worst required time for a setup timing requirement). Once the arrival and required times have been computed for each pin in the circuit design, the timing slack can be computed by subtracting the arrival time from the required time. In some embodiments, a negative slack value represents a timing requirement violation.

The slew values at each pin can be computed by using a computation that is similar to the arrival time computation, e.g., by propagating the slew values from the timing start-points to the timing end-points. The term "timing information" generally refers to any value that is used in determining whether or not a circuit design satisfies a given set of timing requirements. Therefore, the term "timing information" includes, but is not limited to, arrival times, required times, timing slack, and slew. Further details on techniques for determining timing information can be found in Luciano Lavagno (Editor), Louis Scheffer (Editor), Grant Martin (Editor), *EDA for IC Implementation, Circuit Design, and Process Technology* (*Electronic Design Automation for Integrated Circuits Handbook*), CRC Press, 1$^{st}$ Ed., March 2006.

FIG. 3 illustrates an example of a circuit design that includes multiple MIM instances in accordance with some embodiments described herein. Circuit design 300 includes four MIM instances, namely, MIM instances 302, 304, 306, and 308. As shown in FIG. 3, an MIM instance may be a rotated version and/or a mirror image of another MIM instance. The circuitry around an MIM instance is called the context. For example, context 310 represents circuitry around MIM instance 302, and context 312 represents circuitry around MIM instance 306. Clearly, the timing information at a pin within an MIM instance depends on its context which can be different for different MIM instances. Specifically, a given pin in an MIM instance (e.g., MIM instance 302) may have a different timing slack and/or different timing slew than a corresponding pin in another MIM instance (e.g., MIM instance 306) because of the differences between their contexts (e.g., because of the differences between contexts 310 and 312).

FIG. 4A illustrates a merged timing graph in accordance with some embodiments described herein. A circuit design can include multiple instances of an MIM, e.g., MIM instance 402-1 through MIM instance 402-n. Merged timing graph 406 can be created based on the MIM. In some embodiments, each node in the merged timing graph can correspond to a pin in the MIM, and each edge in the merged timing graph can correspond to a timing arc in the MIM. For example, node 408 can correspond to an input pin of a gate and node 410 can correspond to an output pin of the gate, and the edge from node 408 to node 410 can correspond to a timing arc from the input pin of the gate to the output pin of the gate. Each pin in an MIM corresponds to a pin in an MIM instance because each MIM instance is simply a copy of the MIM that is instantiated at a particular location in the circuit design. Therefore, each node in the merged timing graph corresponds to a pin in each MIM instance. As shown in FIG. 4A, the top input pin of gate 404-1 in MIM instance 402-1 corresponds to the top input pin of corresponding gates in other MIM instances (e.g., gate 404-n in MIM instance 402-n). And, these input pins also correspond to a node (e.g., node 408) in merged timing graph 406. Note that a single merged timing graph (e.g., merged timing graph 406) exists for the multiple MIM instances (e.g., MIM instance 402-1 through MIM instance 402-n).

FIG. 4B illustrates an example of a data structure associated with a node in a merged timing graph in accordance with some embodiments described herein. The data structure shown in FIG. 4B can be associated with node 408 in merged timing graph 406. The data structure can store timing information, such as arrival time, required time, slack, and slew, at a given pin in different MIM instances. For example, the data structure shown in FIG. 4B can store the timing information corresponding to the top input pin of gates 404-1 through 404-n. Note that the "Arrival Time (MIM instance 402-1)" label in FIG. 4B corresponds to the arrival time at the top input pin of gate 404-1, etc.

The worst timing information refers to the timing information that is of greatest concern from a circuit design perspective. The worst timing information can be the maximum value or the minimum value depending on the type of timing information. For example, the minimum slack value is the worst slack value because it is either the greatest violating slack value (if the slack value is negative) or it is the slack value that is closest to violating a timing requirement (if the slack value is positive).

The data structure can also store the worst timing information associated with a pin across all MIM instances. For example, as shown in FIG. 4B, the data structure can store (and automatically update as the timing information is updated) the worst slack and the worst slew. In general, the data structure can store any timing information statistic. The example of the data structure shown in FIG. 4B is for illustration purposes only and is not intended to limit the scope of the disclosed embodiments.

FIG. 1C illustrates a process for determining an ECO for the MIM based on the merged timing graph in accordance with some embodiments described herein. The process can begin by determining the worst timing information for each node in the merged timing graph based on the stored timing information associated with the multiple instances of the MIM (operation 132). For example, the process may determine the worst slack and the worst slew for each node in the merged timing graph. Note that the worst timing information associated with two different nodes in the merged timing graph may correspond to the timing information at two different pins in two different MIM instances. For example, the worst timing information (e.g., slack) at a first node may be equal to the timing information at a first pin in a first instance of the MIM, whereas the worst timing information at a second node may be equal to the timing information at a second pin in a second instance of the MIM.

Next, the process can determine an ECO for the MIM based on the worst timing information at each node in the merged timing graph (operation 134). For example, the process can identify a bottleneck node which lies on the maximum number of violating paths in the merged timing graph, and then identify the bottleneck cell (or gate) in the MIM that corresponds to the bottleneck node. For example, if a bottleneck node corresponds to an output of a cell, then that cell can be selected as the bottleneck cell. Next, the process can select a replacement cell from a cell library to replace the identified bottleneck cell. For example, the process may select the smallest area cell to replace the identified bottleneck cell that fixes the most number of timing violations. Next, the process can create an ECO that replaces the identified bottleneck cell with the selected replacement cell.

In some embodiments, the process can identify nodes in the merged timing graph for creating ECOs for area recovery and power optimization. For example, the process can identify nodes that have high slack values and/or high slew values (e.g., the process can identify nodes with the worst slack values and/or worst slew values), and select the gates or cells associated with the identified nodes as candidates for creating area recovery ECOs and/or power optimization ECOs.

Applying an ECO to a gate or cell in an MIM can change the timing information of the MIM instances. Specifically, referring back to FIG. 2, applying an ECO to gate 202 can change the capacitive load on gate 204 (whose output drives an input of gate 202). This can change the arrival times and slews at gate 204's output, gate 202's input, and gate 206's input. These changes can ripple forward through fan-out cones 208 and 210 to the timing end-points. This, in turn, can cause the required times in the entire fan-in cone 212 of these timing end-points to be out-of-date. Hence, after propagating the timing information in the forward direction, we may need to propagate required times in the backward direction along fan-in cone 212 to the timing start-points. Further details on static timing analysis and propagation of timing information can be found in Luciano Lavagno (Editor), Louis Scheffer (Editor), Grant Martin (Editor), *EDA for IC Implementation, Circuit Design, and Process Technology* (*Electronic Design Automation for Integrated Circuits Handbook*), CRC Press, 1$^{st}$ Ed., March 2006.

Figure 1D:
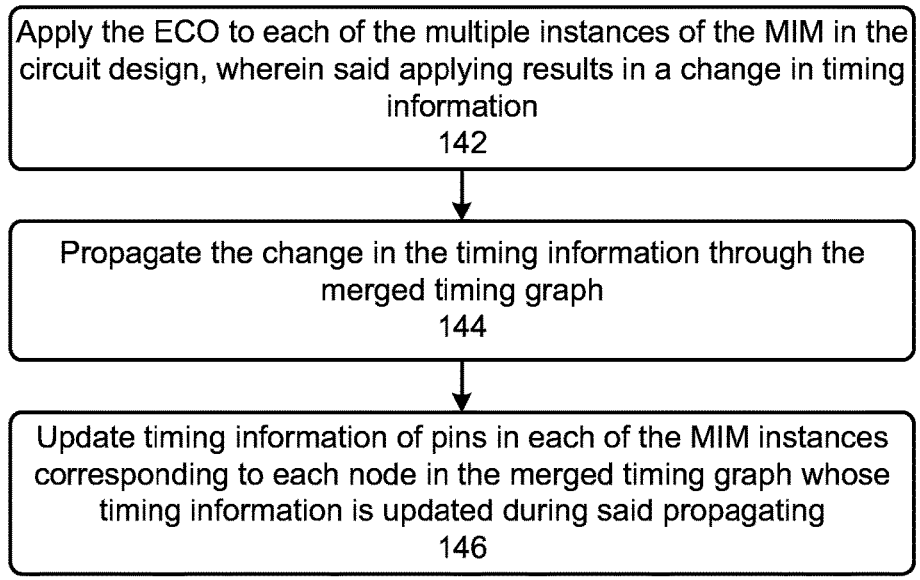
FIG. 1D illustrates a process for applying an ECO to an MIM and updating timing information in accordance with some embodiments described herein.

FIG. 1D illustrates a process for applying an ECO to an MIM and updating timing information in accordance with some embodiments described herein. The process can begin by applying the ECO to each of the multiple instances of the MIM in the circuit design, wherein said applying results in a change in timing information (operation 142). Next, the process can propagate the change in the timing information through the merged timing graph (operation 144), and update timing information of pins in each of the MIM instances corresponding to each node in the merged timing graph whose timing information is updated during said propagating (operation 146). Specifically, the timing information stored in the data structures corresponding to the nodes in the merged timing graph can be updated as the change in the timing information is propagated through the merged timing graph.

Computer

Figure 5:
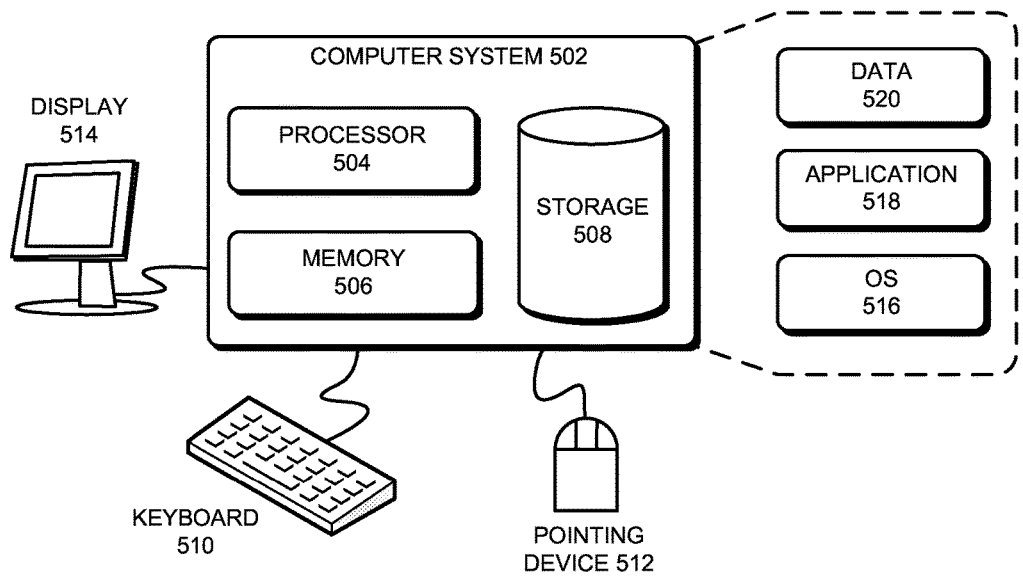
FIG. 5 illustrates a computer in accordance with some embodiments described herein.

The term "computer" generally refers to any hardware based system that is capable of performing computations, and includes, but is not limited to, a personal computer, a laptop computer, a desktop computer, a handheld computer, a smartphone, a tablet computer, a distributed computer, a server farm, a single processor or multi-processor system, and a cloud based computing system. FIG. 5 illustrates a computer in accordance with some embodiments described herein. Computer 502 can include processor 504, memory 506, and storage device 508. Specifically, memory locations in memory 506 can be addressable by processor 506, thereby enabling processor 504 to access (e.g., via load/store instructions) and manipulate (e.g., via logical/floating point/arithmetic instructions) the data stored in memory 506. Computer 502 can be coupled to display device 514, keyboard 510, and pointing device 512. Storage device 508 can store operating system 516, application 518, and data 520. Data 520 can include input required by application 518 and/or output generated by application 518.

Computer 502 may automatically (or with user intervention) perform one or more operations that are implicitly or explicitly described in this disclosure. For example, computer 502 can load application 518 into memory 506, and application 518 can then be used to determine and apply ECOs in a circuit design that includes multiple MIM instances.

CONCLUSION

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for determining an engineering change order (ECO) for a multi-instance module (MIM) in a circuit design that includes multiple instances of the MIM, the method comprising:
    creating a merged timing data structure that is associated with a pin of the MIM, wherein the merged timing data structure stores timing information for the pin across the multiple instances of the MIM, and wherein the timing information includes at least one of an arrival time, a required time, a slack, or a slew; and
    determining the ECO for the MIM by using a processor that accesses the merged timing data structure, wherein said determining comprises using the merged timing data structure to compute a change in the timing information for the pin across the multiple instances of the MIM when an incremental adjustment is applied to the MIM.

2. The method of claim 1, wherein the ECO fixes a timing violation by replacing a cell in the MIM with another cell.

3. The method of claim 1, wherein the merged timing data structure comprises a field that stores a worst slack of a pin of the MIM across the multiple instances of the MIM.

4. The method of claim 1, wherein the merged timing data structure comprises a field that stores a worst slew of a pin of the MIM across the multiple instances of the MIM.

5. A non-transitory computer-readable storage medium storing instructions that, when executed by a processor, cause the processor to perform a method for determining an engineering change order (ECO) for a multi-instance module (MIM) in a circuit design that includes multiple instances of the MIM, the method comprising:
    creating a merged timing data structure that is associated with a pin of the MIM, wherein the merged timing data structure stores timing information for the pin across the multiple instances of the MIM, and wherein the timing information includes at least one of an arrival time, a required time, a slack, or a slew; and determining the ECO for the MIM, wherein said determining comprises using the merged timing data structure to compute a change in the timing information for the pin across the multiple instances of the MIM when an incremental adjustment is applied to the MIM.

6. The non-transitory computer-readable storage medium of claim 5, wherein the ECO fixes a timing violation by replacing a cell in the MIM with another cell.

7. The non-transitory computer-readable storage medium of claim 5, wherein the merged timing data structure comprises a field that stores a worst slack of a pin of the MIM across the multiple instances of the MIM.

8. The non-transitory computer-readable storage medium of claim 5, wherein the merged timing data structure comprises a field that stores a worst slew of a pin of the MIM across the multiple instances of the MIM.

9. An apparatus, comprising:
a processor; and
a non-transitory computer-readable storage medium storing instructions that, when executed by the processor, cause the processor to perform a method for determining an engineering change order (ECO) for a multi-instance module (MIM) in a circuit design that includes multiple instances of the MIM, the method comprising:
creating a merged timing data structure that is associated with a pin of the MIM, wherein the merged timing data structure stores timing information for the pin across the multiple instances of the MIM, and wherein the timing information includes at least one of an arrival time, a required time, a slack, or a slew; and
determining the ECO for the MIM, wherein said determining comprises using the merged timing data structure to compute a change in the timing information for the pin across the multiple instances of the MIM when an incremental adjustment is applied to the MIM.

10. The apparatus of claim 9, wherein the ECO fixes a timing violation by replacing a cell in the MIM with another cell.

11. The apparatus of claim 9, wherein the merged timing data structure comprises a field that stores a worst slack of a pin of the MIM across the multiple instances of the MIM.

12. The apparatus of claim 9, wherein the merged timing data structure comprises a field that stores a worst slew of a pin of the MIM across the multiple instances of the MIM.

* * * * *